(12) United States Patent
Suzuki (10) Patent No.: US 7,843,501 B2
(45) Date of Patent: Nov. 30, 2010

(54) IMAGE SENSING APPARATUS AND DEFECT CORRECTION METHOD

(75) Inventor: Shoichi Suzuki, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 1136 days.

(21) Appl. No.: 10/978,199

(22) Filed: Oct. 29, 2004

(65) Prior Publication Data
US 2005/0099505 A1  May 12, 2005

(30) Foreign Application Priority Data
Oct. 31, 2003 (JP) ............................. 2003-372577

(51) Int. Cl.
*H04N 9/64* (2006.01)

(52) U.S. Cl. .................................................. 348/246

(58) Field of Classification Search .................. 348/246, 348/247
See application file for complete search history.

(56) References Cited

U.S. PATENT DOCUMENTS

| | | | | |
|---|---|---|---|---|
| 5,608,455 A | * | 3/1997 | Oda ........................... | 348/295 |
| 5,696,554 A | * | 12/1997 | Hwang ....................... | 348/246 |
| 6,529,622 B1 | * | 3/2003 | Pourjavid ................... | 382/149 |
| 6,970,193 B1 | * | 11/2005 | Kidono et al. .............. | 348/245 |
| 7,113,210 B2 | * | 9/2006 | Bloom ........................ | 348/243 |
| 2001/0028392 A1 | * | 10/2001 | Yamamoto et al. .......... | 348/207 |

FOREIGN PATENT DOCUMENTS

| | | |
|---|---|---|
| CN | 1126403 A | 7/1996 |
| JP | 7-67038 A | 3/1995 |
| JP | 10-42201 A | 2/1998 |
| JP | 2000-209506 A | 7/2000 |
| JP | 2001-036819 A | 2/2001 |

OTHER PUBLICATIONS

CN Office Action dated Jul. 14, 2006.
The above references were cited in a Jun. 30, 2009 Japanese Office Action that issued in Japanese Patent Application No. 2003-372577, which is enclosed without English Translation.

* cited by examiner

*Primary Examiner*—David L Ometz
*Assistant Examiner*—Dillon Durnford-Geszvain
(74) *Attorney, Agent, or Firm*—Cowan, Liebowitz & Latman, P.C.

(57) ABSTRACT

In an image sensing device having an effective pixel area and an optical black area, a vertical line of the optical black area corresponding to a vertical line, which has a defect in the effective pixel area, is selected from among vertical lines of the image sensing device, and a signal, which has been produced by the defect, is calculated based upon result of selection and a defect correction is performed.

5 Claims, 10 Drawing Sheets

| | OBAveR_left<br>OBAveG2_left | | OBAveR_cent<br>OBAveG2_cent | | OBAveR_right<br>OBAveG2_right |
|---|---|---|---|---|---|
| 11 { | R | G1 | R | G1 | R |
| | G2 | B | G2 | B | G2 |
| | R | G1 | R | G1 | R |
| | G2 | B | G2 | B | G2 |
| 12 { | R | G1 | R | G1 | R |
| | G2 | B | G2 | B | G2 |
| | R | G1 | R | G1 | R |
| | G2 | B | G2 | B | G2 |
| | R | G1 | R | G1 | R |
| | G2 | B | G2 | B | G2 |
| | R | G1 | R | G1 | R |
| | G2 | B | G2 | B | G2 |
| | R | G1 | R | G1 | R |
| | G2 | B | G2 | B | G2 |
| | R | G1 | R | G1 | R |
| | G2 | B | G2 | B | G2 |
| | R | G1 | R | G1 | R |
| | G2 | B | G2 | B | G2 |
| | R | G1 | R | G1 | R |
| | G2 | B | G2 | B | G2 |
| | R | G1 | R | G1 | R |
| | G2 | B | G2 | B | G2 |

IMAGE SENSING APPARATUS AND DEFECT CORRECTION METHOD

FIELD OF THE INVENTION

This invention relates to an image sensing apparatus such as a digital still camera or digital video camera, a defect correction method for correcting defects in such an image sensing apparatus, a computer program for this method and a computer-readable recording medium having the program recorded thereon.

BACKGROUND OF THE INVENTION

An image sensing apparatus using a solid-state image sensing device, such as a digital camera, now finds use in a variety of applications. There are instances where an image sensing device develops pixel failure, namely a phenomenon in which failure occurs pixel by pixel during the course of or after manufacture, resulting in output of signal having an abnormal level. The number of pixels used in solid-state image sensing devices is increasing year by year and it is conceivable that this will be accompanied also by an increase in the number of defective pixels.

In an image sensing device such as a CCD, if a phenomenon of local sensitivity failure developed in a semiconductor occurs during the course of or after manufacture among pixels arranged in two dimensions, output of charge corresponding to a quantity of incoming light can not be obtained. This causes a conspicuous white or black dot unrelated to an object in a sensed image as so-called failure pixel. As methods for correcting the white or black dot, a method of replacing the pixel value of a failure pixel with the pixel value of the adjoining pixel and a method of interpolating the pixel value of a failure pixel with a median or average of pixel values of the neighboring pixels have been proposed as described in Japanese Patent Application Laid-Open No. 10-42201, for instance.

Pixel failure involves a variety of characteristics. In particular, with regard to defective pixels having a characteristic such that the high level signal appears on all vertical lines of the image sensing device, the display error that occurs on the display screen of the image sensing device owing to such failure is readily noticeable by the human eye since the failure appears as a white line (called white defect). Moreover, owing to the trouble that ensues when there is a change in the level of the defect due to temperature or aging, various correction schemes have been proposed heretofore and display error has become inconspicuous owing to such correction. For example, the specification of Japanese Patent Application Laid-Open No. 07-067038 describes a correction method comprising averaging and deleting random noise components by integrating (adding and averaging), on a per-pixel basis, an output signal of an optical black pixel in a vertical direction of a solid-state image sensing device, detecting a fixed-pattern noise signal by line, and subtracting the fixed-pattern noise from the output signal of an effective pixel area of the solid-state image sensing device by line, whereby it is possible to improve upon dark current components, white lines and smear, etc., which are fixed-pattern noise.

However, with the prior-art correction scheme of the kind described in the specification of Japanese Patent Application Laid-Open No. 10-42201, there are instances where the image after correction becomes discontinuous in a case where a boundary between light and dark regions is present in the vicinity of a defective pixel or in a case where there is a sudden change in contrast in the vicinity of a defective pixel.

Further, with the prior-art correction scheme of the kind described in the specification of Japanese Patent Application Laid-Open No. 07-067038, the result obtained by adding and averaging the output signal of the optical black pixel area is subtracted uniformly from the output signal of the effective pixel area. As a result, though black-current noise and white defects are corrected, there is a possibility that noise will increase due to an effect of random noise, for instance, present in an optical black image, where defects are absent. Further, an overcorrection in which the signal is subtracted excessively occurs in a case where the output signal from an optical black pixel area or effective pixel area saturates or in a case where, in the correction of a defective pixel of a white defect having a characteristic in which the noise appears on all vertical lines of the image sensing device, the output of the vertical-line signal produced from the defective pixel is non-uniform owing to the position of the defective pixel. A problem which arises is that there is a needless decline in image quality.

SUMMARY OF THE INVENTION

The present invention has been made in consideration of the above-mentioned circumstances and has as its object to prevent an increase in image degradation caused by random noise put on an image where there is no defect, thereby making it possible to correct defects in an appropriate manner.

According to the present invention, the foregoing object is attained by providing an image sensing apparatus comprising: a selection unit that selects from among vertical lines of an image sensing device having an effective pixel area and an optical black area a vertical line in the optical black area corresponding to a vertical line in the effective pixel area having a defect, on the basis of a determination result of determining that a vertical line has a defect in the effective pixel area; and a correction unit that corrects a signal from the vertical line having the defect in the effective pixel area corresponding to the vertical line in the optical black area selected by the selection unit using a signal of the vertical line in the optical black area selected by the selection unit.

According to the present invention, the foregoing object is also attained by providing a defect correction method for correcting a defect in an image sensing apparatus that includes an image sensing device having an effective pixel area and an optical black area, the method comprising: selecting from among vertical lines of an image sensing device a vertical line in the optical black area corresponding to a vertical line in the effective pixel area having a defect, on the basis of a determination result of determining that a vertical line has a defect in the effective pixel area; an correcting a signal from a vertical line having the defect in the effective pixel area corresponding to the selected vertical line in the optical black area using a signal of the vertical line in the optical black area selected by the selection unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

First Embodiment

Figure 1:
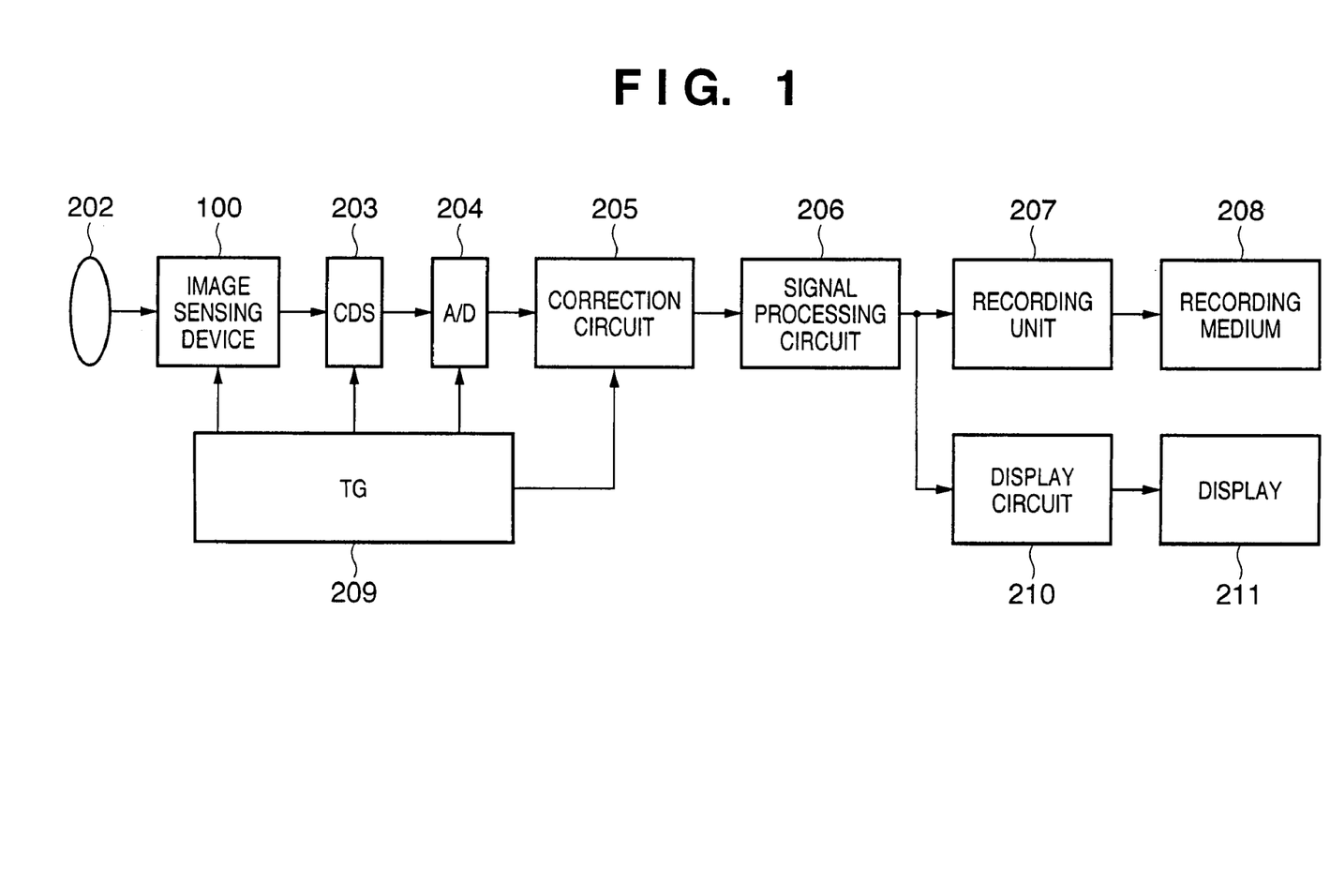
FIG. 1 is a diagram illustrating the structure of an image sensing apparatus according to first, second and third embodiments of the present invention.

FIG. 1 is a diagram illustrating the structure of an image sensing apparatus having a correction circuit according to a first embodiment of the present invention.

As shown in FIG. 1, light beam passed through an optical block 202 which comprises an image sensing lens or the like is brought to a photo-receiving surface of an image sensing device 100. This causes photodiodes which form the photo-receiving surface of the image sensing device 100 to generate an image signal corresponding to an object image. The image sensing device 100 is driven by a timing generator (TG) 209, and the image signal outputted from the image sensing device 100 is inputted to the correlated double sampling (CDS) circuit 203. Then the image signal undergoes predetermined signal processes, such as reset noise removal or the like, and sample and hold process by the CDS circuit 203 in accordance with the timing signal determined by the TG 209, then is outputted to the A/D converter 204. The A/D converter 204 performs A/D conversion in accordance with the clock signal provided from the TG 209. The image signal digitized by the A/D converter 204 is corrected in a correction circuit 205, then outputted. The detailed structure of the correction circuit 205 will be described later.

The output from the correction circuit 205 is inputted to a signal processing circuit 206, where processes, such as color conversion, white balance correction, γ correction, and so on, are applied to the image signal. The processed image signal is converted to a luminance signal and color difference signals (YCrCb). The output from the signal processing circuit 206 undergoes processes such as compression in a recording circuit 207, thereafter is converted to a signal of predetermined format, then recorded on a removable recording medium 208. Further, the output from the signal processing circuit 206 undergoes processes such as size reduction, enlargement, superimposing, and so on, in the display circuit, thereafter is converted to an analog signal conforming to, for instance, NTSC standard, then displayed on a display 211.

Figure 2:
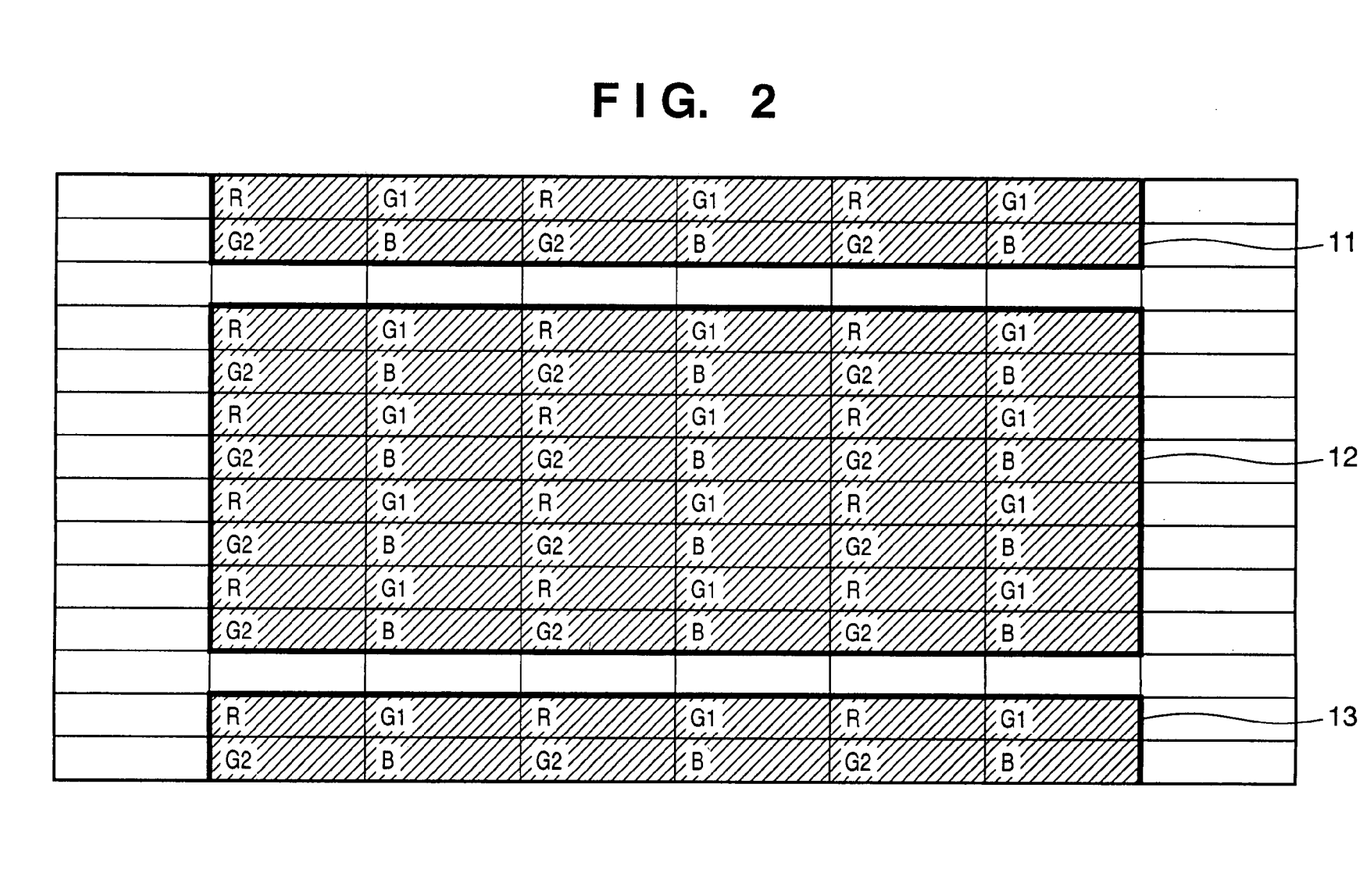
FIG. 2 is a diagram useful in describing the structure of an image sensing device according to the first embodiment.

FIG. 2 is a diagram useful in describing the structure of an image sensing device 100. As shown in FIG. 2, the image sensing device 100 is composed of pixels arrayed two-dimensionally in row and column directions and is formed to include an effective area (image area) 12 that is sensitive to light and ineffective areas [referred to as "OB" (Optical Black) areas below] 11 and 13, which are not sensitive to light, above and below the image area 12, respectively.

Figure 3:
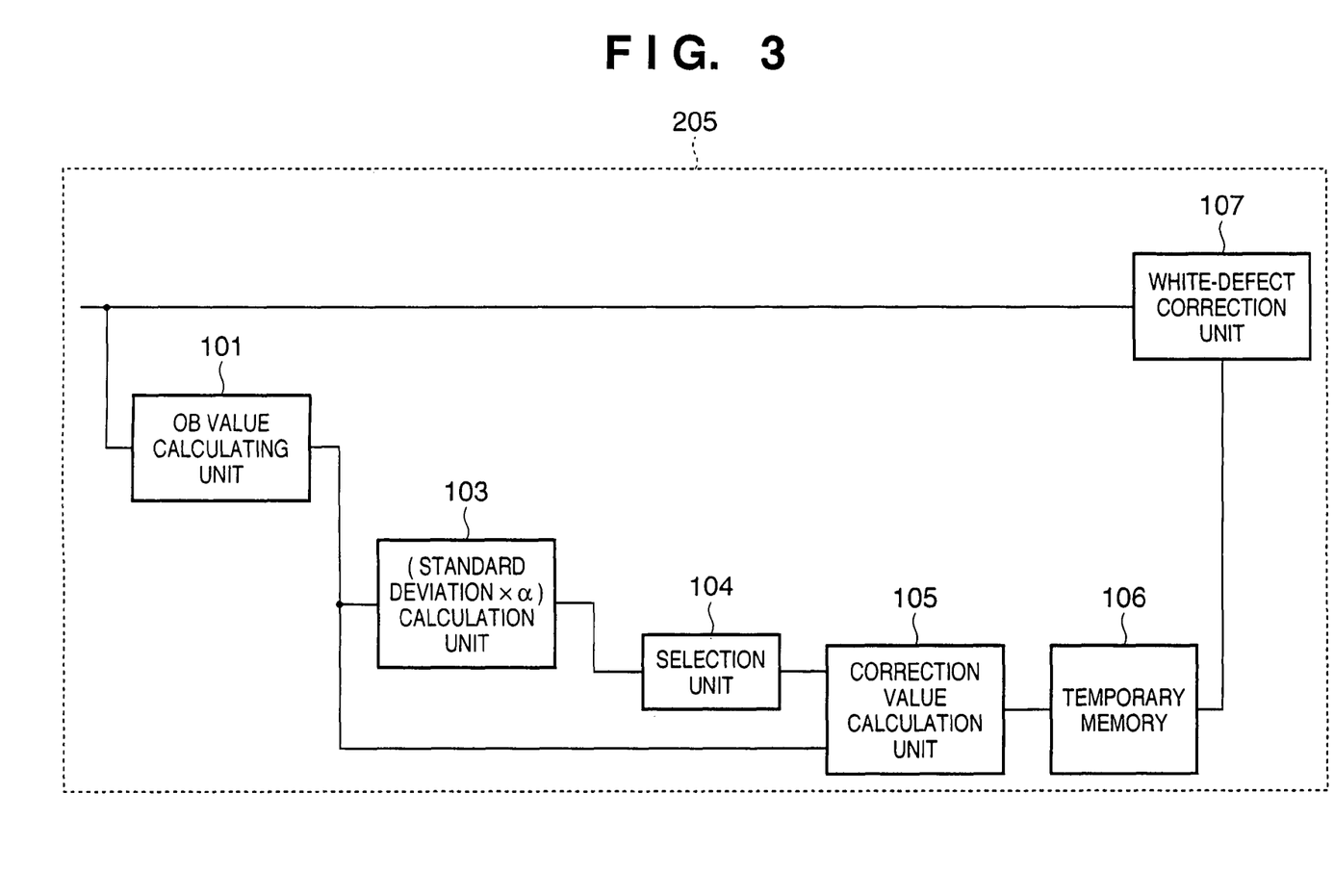
FIG. 3 is a diagram useful in describing the structure of a correction circuit according to the first embodiment.

Next, the detailed structure of the correction circuit 205 will be described with reference to FIG. 3.

The correction circuit 205 includes an OB value calculating unit 101, a (standard deviation×α) calculation unit 103, a selection unit 104, a correction value calculation unit 105, a temporary memory 106, and a white defect correction unit 107. The OB value calculating unit 100 calculates an average value of OB values for every vertical line (vertical pixel group) in the OB area 11 at the top of the image sensing device 100. The (standard deviation×α) calculation unit 103 obtains a normal distribution regarding the average value of the OB values for every vertical lines, and calculates a value obtained by multiplying the standard deviation by α. The selection unit 104 determines whether each vertical line has a white defect based upon the average value of OB values calculated by the OB value calculating unit 101 and selects the vertical line or lines having white defect or defects. The correction value calculation unit 105 calculates a correction value based on the OB values for each vertical line determined by the selection unit 104 to have white defect. The temporary memory 106 temporarily stores the correction value calculated by the correction value calculation unit 105. The white-defect correcting unit 107 performs a white-defect correction based on the correction value stored in the temporary memory 106.

Figure 4:
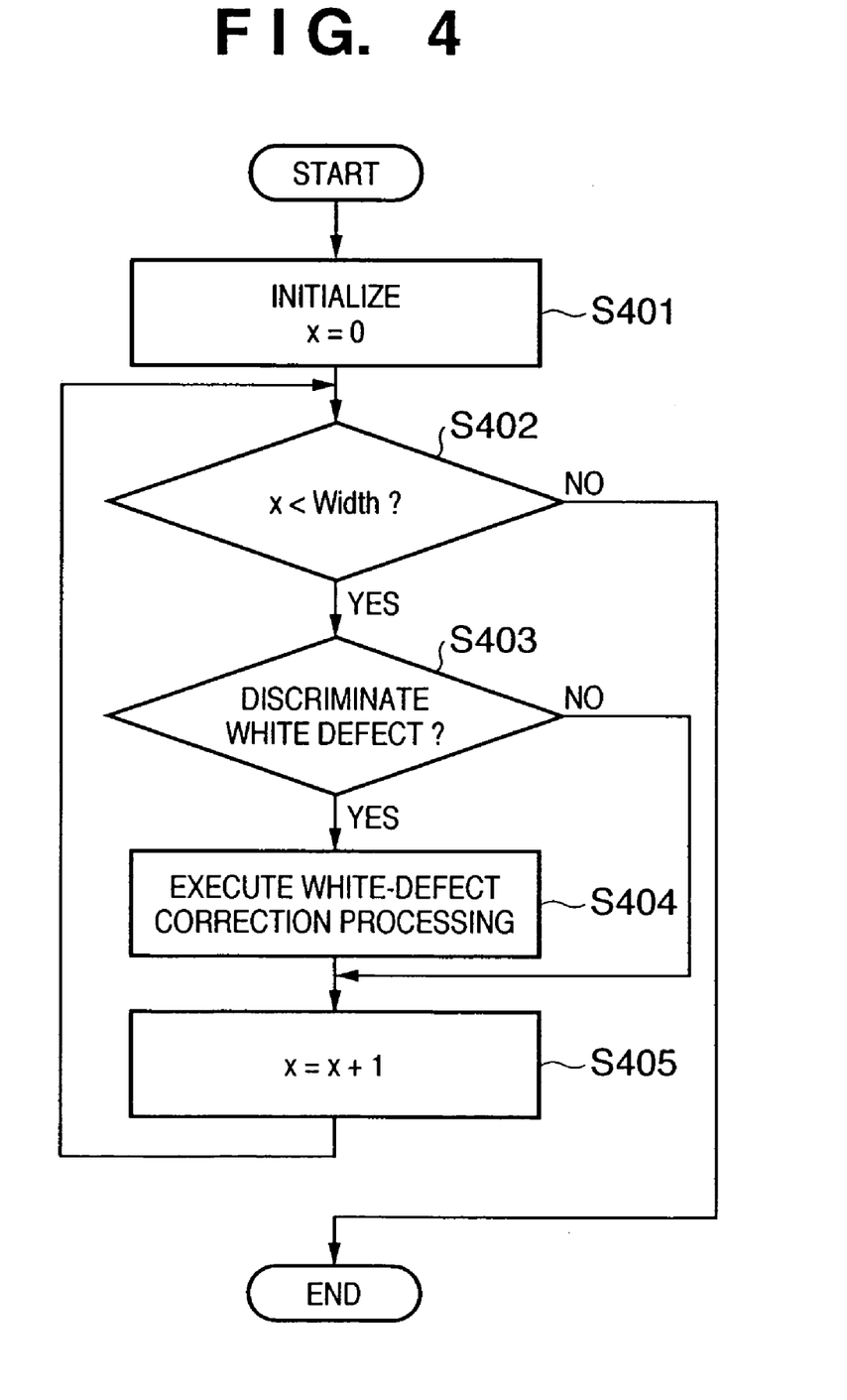
FIG. 4 is a flowchart for describing white-defect correction processing according to the first embodiment.

Processing for the white-defect correction will be described with reference to the flowchart of FIG. 4. First, an address x in the horizontal direction is initialized (x=0) at step S401 and it is determined at step S402 whether the horizontal address x lies within a horizontal area Width. If the horizontal address x is outside this area Width, processing according to this flowchart is exited.

It is determined at step S403 whether a vertical line at the horizontal address x has a white defect on the basis of the information, stored in the temporary memory 106, of the vertical line determined to have a white defect. If the vertical line at the horizontal address x does not have a white defect, then control proceeds to step S405 to increment x before control returns to step S402.

Next, a method of detecting a vertical line with a white defect, and storing information on the detected vertical line in the temporary memory 106 will be explained. First the average value of OB values of every vertical line in the upper OB area 11 is calculated by the OB value calculating unit 101 in the manner indicated by the following equations:

R, G2 line:

$$OBAverage = (SumR + SumG2)/n$$

G1, B line:

$$OBAverage = (SumG1 + SumB)/n$$

where SumG1, SumR, SumB and SumG2 represent results obtained by integrating OB values for respective colors in the OB area in the vertical direction, and n represents the number of vertical pixels of the OB area.

Figure 5:
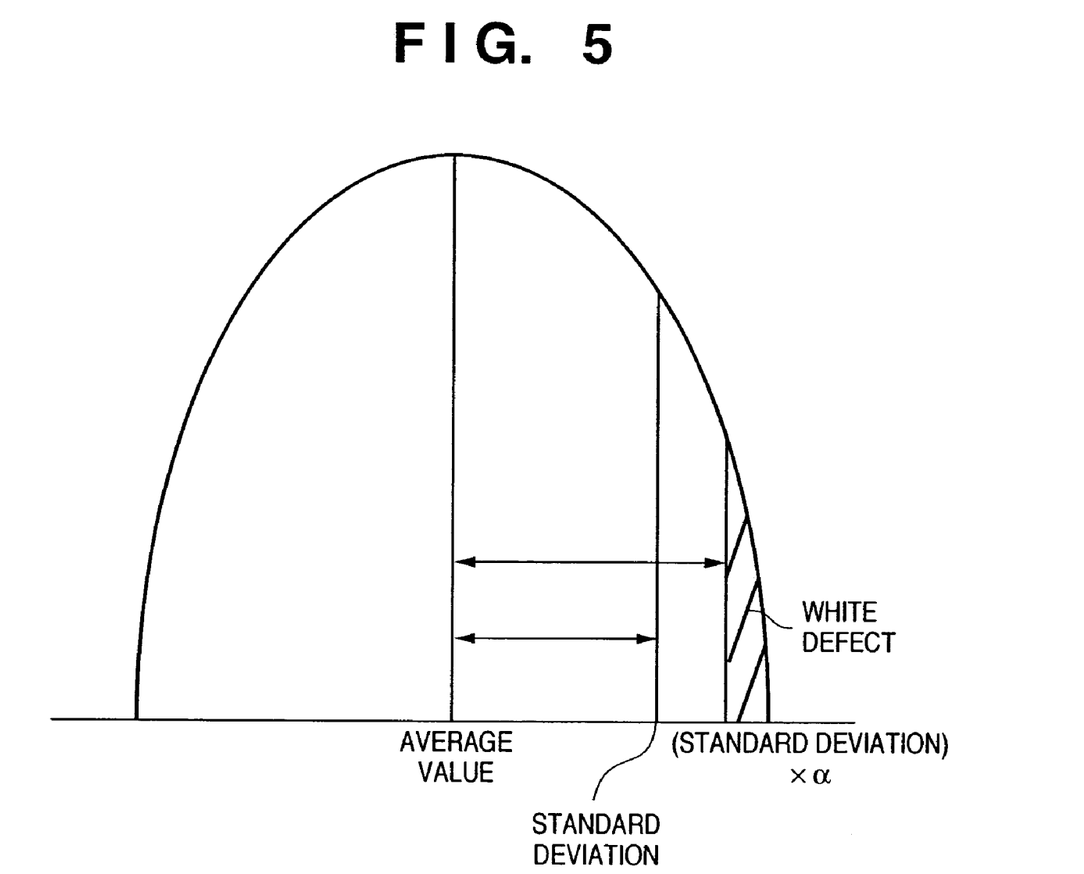
FIG. 5 is a diagram illustrating an example of a normal distribution regarding an average value of optical black values on vertical lines.

Next, the (standard deviation×α) calculation unit 103 obtains a normal distribution with regard to the average value of OB values of every vertical line and calculates (standard deviation×α). As shown in FIG. 5, the selection unit 104 determines that a vertical line possessing an average value of OB values greater than [standard deviation]×α has a white defect. Then, information of the vertical line determined to have a white defect is stored in the temporary memory 106. It should be noted that the parameter α can be set appropriately.

Processing for correcting a white defect is executed at step S404 when the vertical line of the horizontal address x is determined to have a white defect.

The white defect is corrected by reading from the temporary memory 106 a signal value (excess signal value) generated due to a white defect and calculated in the correction value calculation unit 105, and subtracting the read signal value from the signal value of each pixel included in the vertical line having the white defect.

Figure 6:
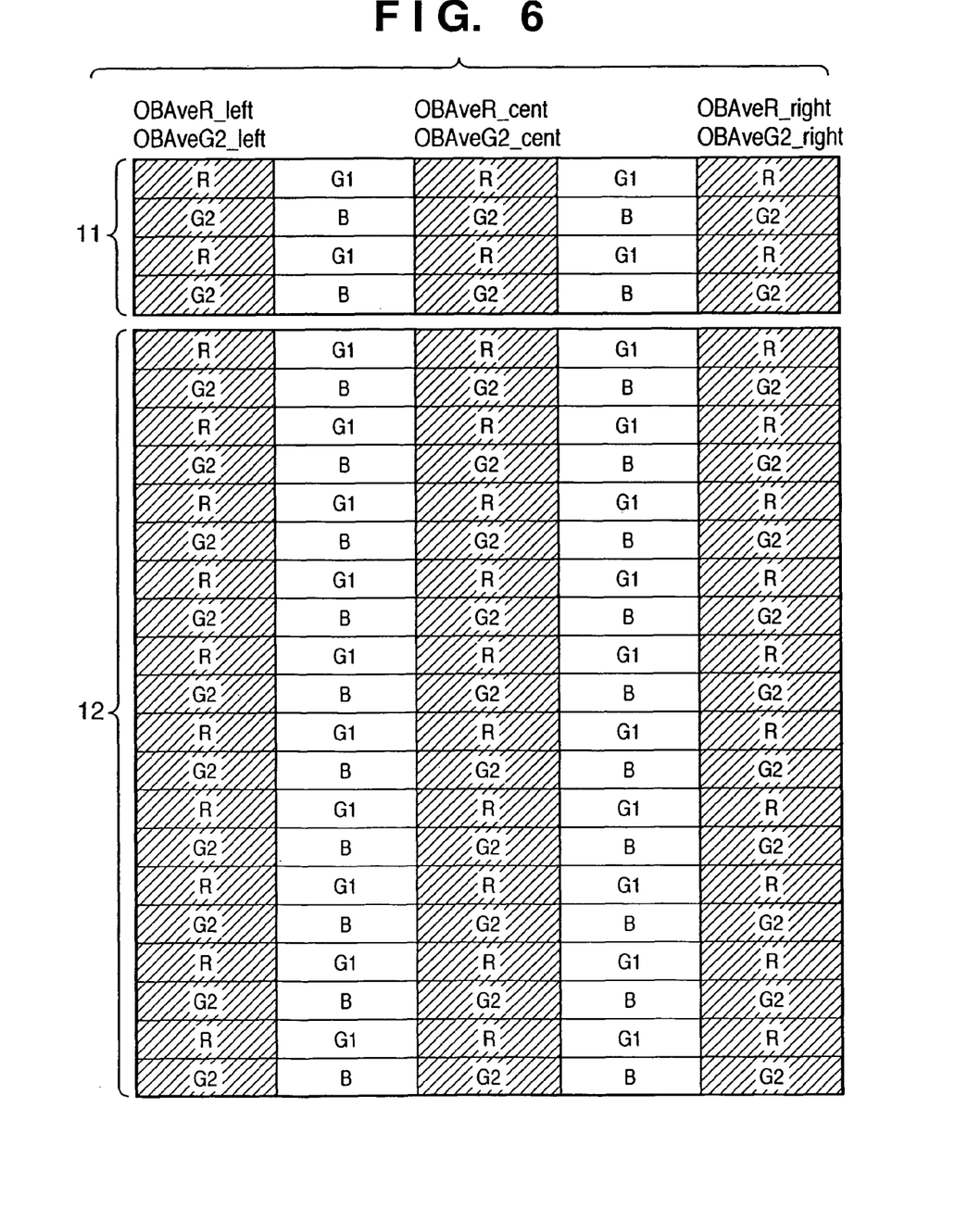
FIG. 6 is a diagram useful in describing a method of calculating a signal value produced by a white defect in the first embodiment.

The method of calculating the signal value (excess signal value) due to the white defect is as follows. First, the OB values of the vertical line having the white defect and the OB values of the vertical lines neighboring the above-mentioned vertical line on both sides, the vertical lines being in the upper OB area 11, are calculated by the correction value calculation unit 105. In the example shown in FIG. 6, the calculation equations are as indicated below. In FIG. 6, the white defect is in the line constituted by R and G2 pixels, though operation is similar in a case where the white defect is in the line constituted by G1 and B pixels.

White-defect line: $OBAveR\_cent = SumR/n$ $OBAveG2\_cent = SumG2/n$

No-white-defect line left: $OBAveR\_left = SumR/n$ $OBAveG2\_left = SumG2/n$

No-white-defect line right: $OBAveR\_right = SumR/n$ $OBAveG2\_right = SumG2/n$

Next, the signal value corresponding to the white defect is calculated. The calculation equations are as follows:

Excess amount of R: $OBAveR\_cent - (OBAveR\_left + OBAveR\_right)/2$

Excess amount of G2: $OBAveG2\_cent - (OBAveG2\_left + OBAveG2\_right)/2$

As described above, by correcting a white defect by subtracting a value corresponding to the white defect from a signal value from an effective pixel area, it becomes unnecessary to control the image sensing apparatus so as to read a noise signal after accumulating charge for the same period as a main image sensing operation while shielding the image sensing device from light, and perform white-defect correction by subtraction. Accordingly, it is possible to obtain a high quality image without increasing a release time lag. Further, since a vertical line having a white defect is selected and the correction processing is performed on the pixel values of the selected vertical line, no random noise is put to signals of vertical lines which do not have white defect. This prevents degradation of image quality due to overcorrection.

Second Embodiment

Figure 7:
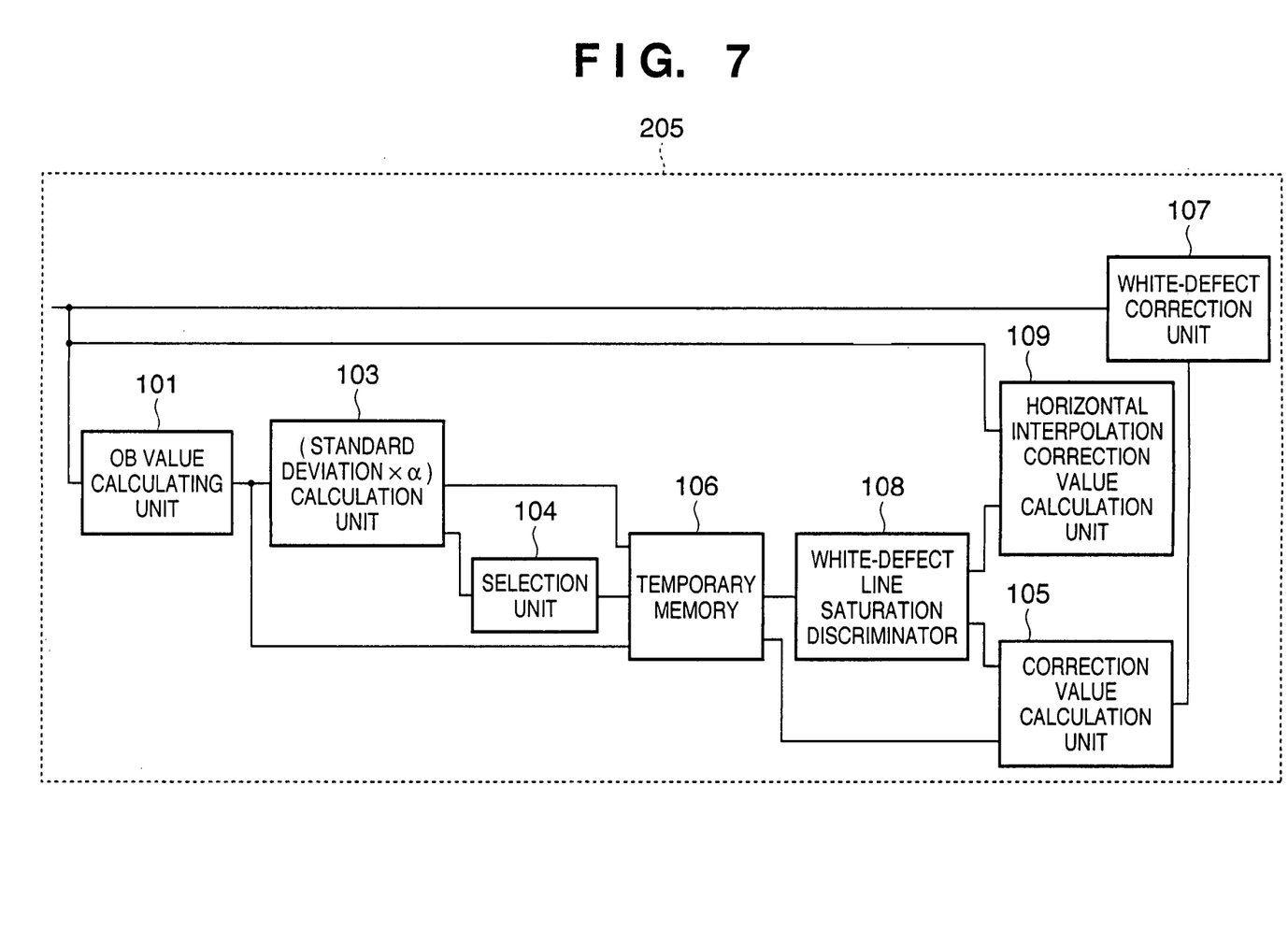
FIG. 7 is a diagram useful in describing the structure of a correction circuit according to a second embodiment of the present invention.

According to the second embodiment, as shown in FIG. 7 the correction circuit 205 comprises a white-defect line saturation discriminator 108 for determining whether a vertical line for which white defect has been discriminated by the selection unit 104 has saturated and a horizontal interpolation correction value calculation units. It should be noted that components in FIG. 7 identical with those of the first embodiment are designated by like reference characters and need not be described again.

With the white-defect correction described above in connection with the first embodiment, a correction cannot be applied if a signal value from a pixel in a vertical line having a white defect (such line is referred to as "white-defect line" hereinafter) saturates. The reason for this is that when a signal value reaches saturation value, clipping of the signal value occurs and, as a consequence, the correct signal value from the image sensing device 100 cannot be specified. In this embodiment, therefore, saturation of white-defect line is discriminated and it is so arranged that a correction can be made even in a case where a white-defect line has saturated.

Figure 8:
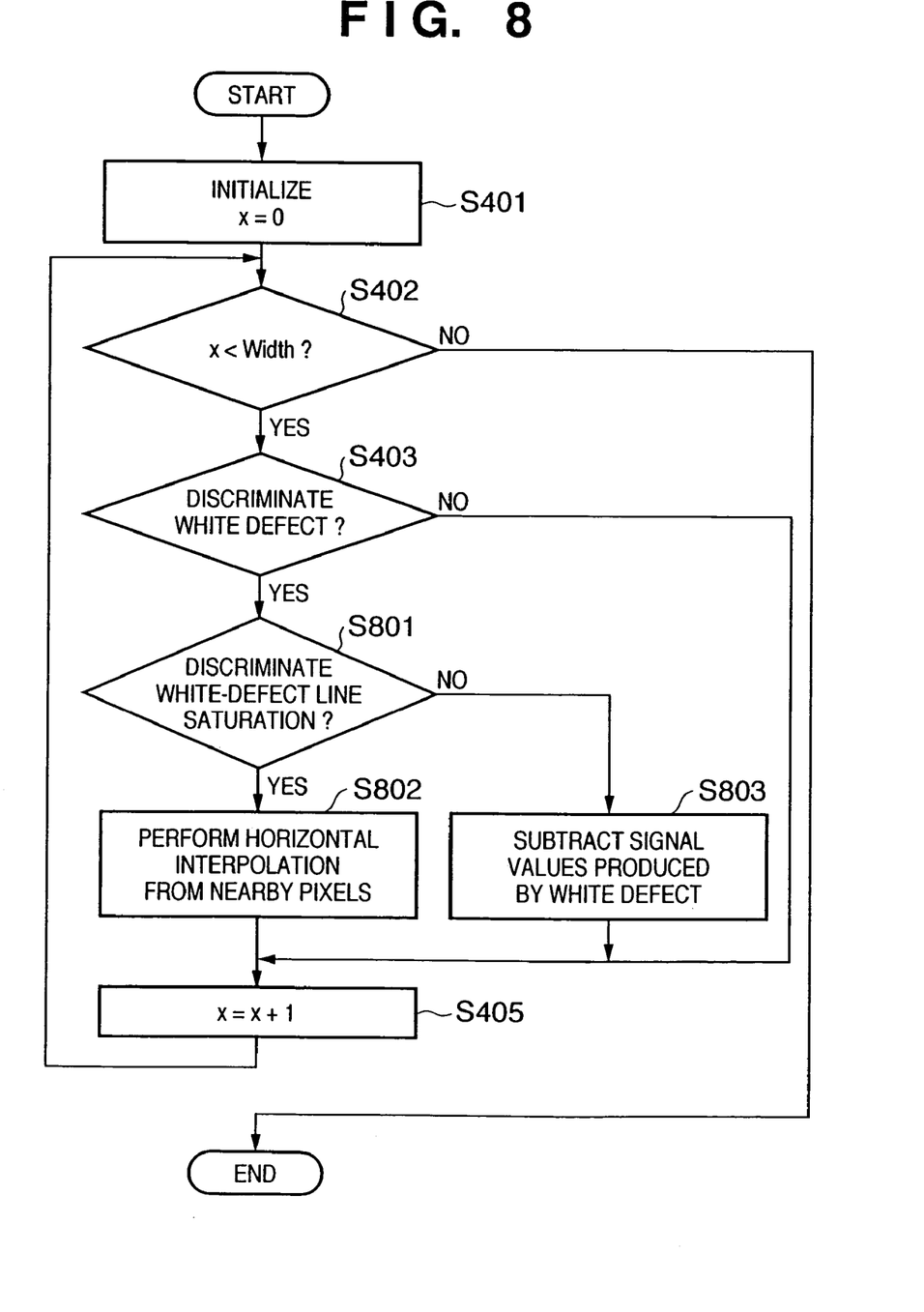
FIG. 8 is a flowchart for describing white-defect correction processing according to the second embodiment.

Processing for the white-defect correction will be described with reference to the flowchart of FIG. 8. Processing steps similar to those in the flowchart of FIG. 4 need not be described in detail again. If white defect is found on a certain vertical line after white defect determination is carried out at step S403, the white-defect line saturation discriminator 108 determines at step S801 whether the white-defect line has saturated. A method of discriminating white-defect line saturation includes obtaining a normal distribution with regard to an average value of OB values of each vertical line, as described above in the first embodiment, and, if the average value of OB values on a vertical line having a white defect takes on a value greater than a preset threshold value, deciding that this white-defect line is a saturated white-defect line. A value greater than the threshold value [(standard deviation)×α] used in discriminating white-defect line is set as the threshold value used in this determination of white-defect line saturation.

Figure 9:
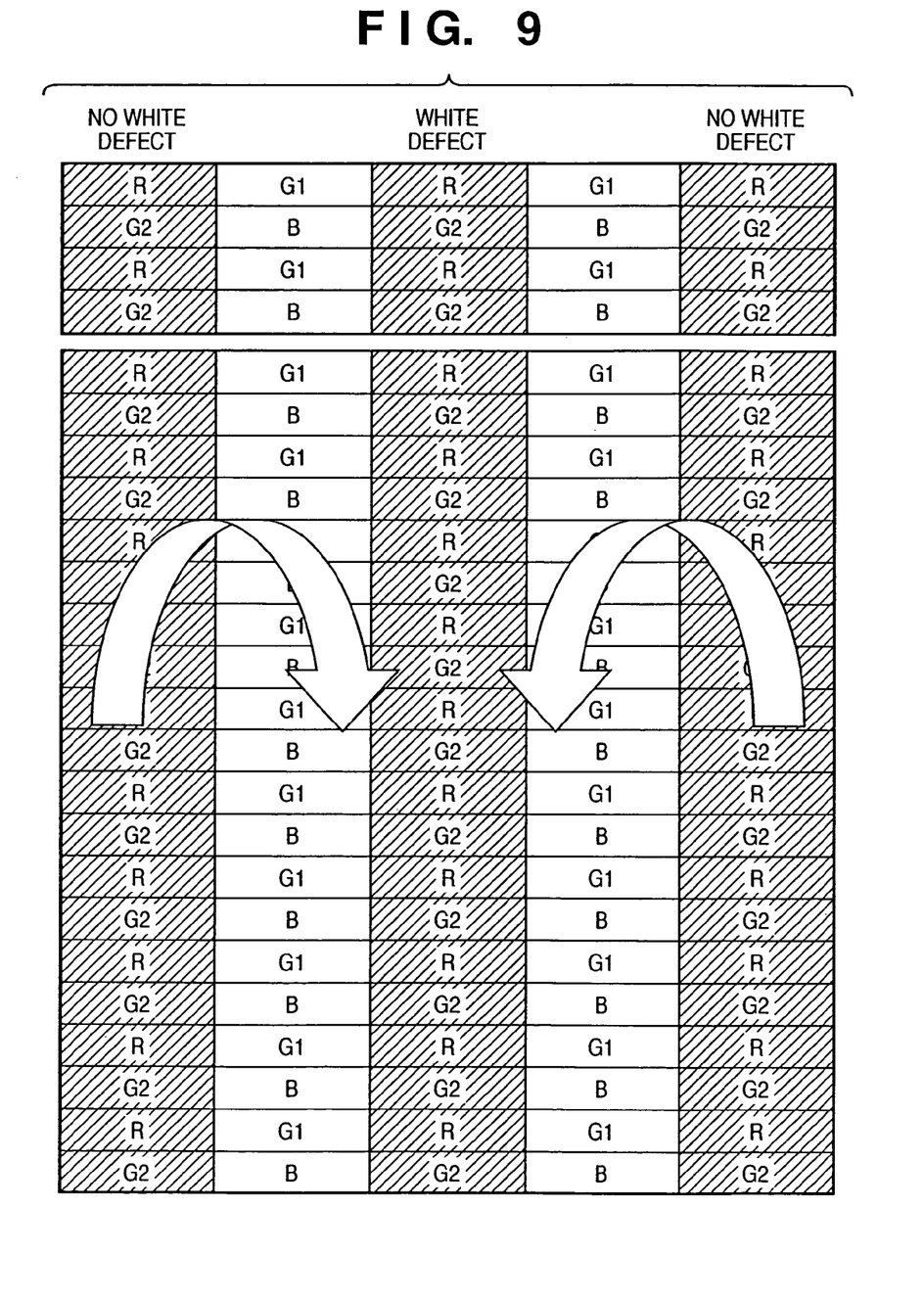
FIG. 9 is a diagram useful in describing horizontal interpolation.

If it is determined by white-defect line saturation discrimination at step S801 that the white-defect line has saturated, a correction value is calculated by the horizontal interpolation correction value calculation unit 109, and the calculated correction value is stored in a temporary memory 106, then a horizontal interpolation is carried out by a white-defect correction unit 107 at step S802 from the signal values of pixels in the vicinity of the white defect (see FIG. 9). Horizontal interpolation methods include a method of simply taking the average of signal values of pixels on both sides, and a method of considering correlation with the white defect and weighting the signal values of the pixels on both sides. For example, it will suffice to employ a conventional method of the kind described in the above-mentioned specification of Japanese Patent Application Laid-Open No. 10-42201 and therefore the method need not be described in detail here.

If it is found by the white-defect line saturation discrimination at step S801 that the white defect line has not saturated, then a white-defect correction is performed by the white-defect correction unit 107 after obtaining a signal component corresponding to the white defect (excess value) by a correction value calculation unit 105 at step S803 using the technique described in the first embodiment.

As described above, whether a white-defect line is saturated or not is determined, and different correction methods suitable for image sensing conditions are used for a case where a white-defect line is saturated and for a case where a white-defect line is not saturated. Accordingly, it is possible to obtain an image of good quality.

Third Embodiment

The first and second embodiments have been described with regard to a correction in a case where a signal value produced by a white defect is added uniformly to vertical lines. However, in case of exposure using a mechanical shutter, a signal value produced by a white defect is not a uniform value and, as a consequence, a white defect starts being produced from the location of a defective pixel in a vertical line.

Figure 10:
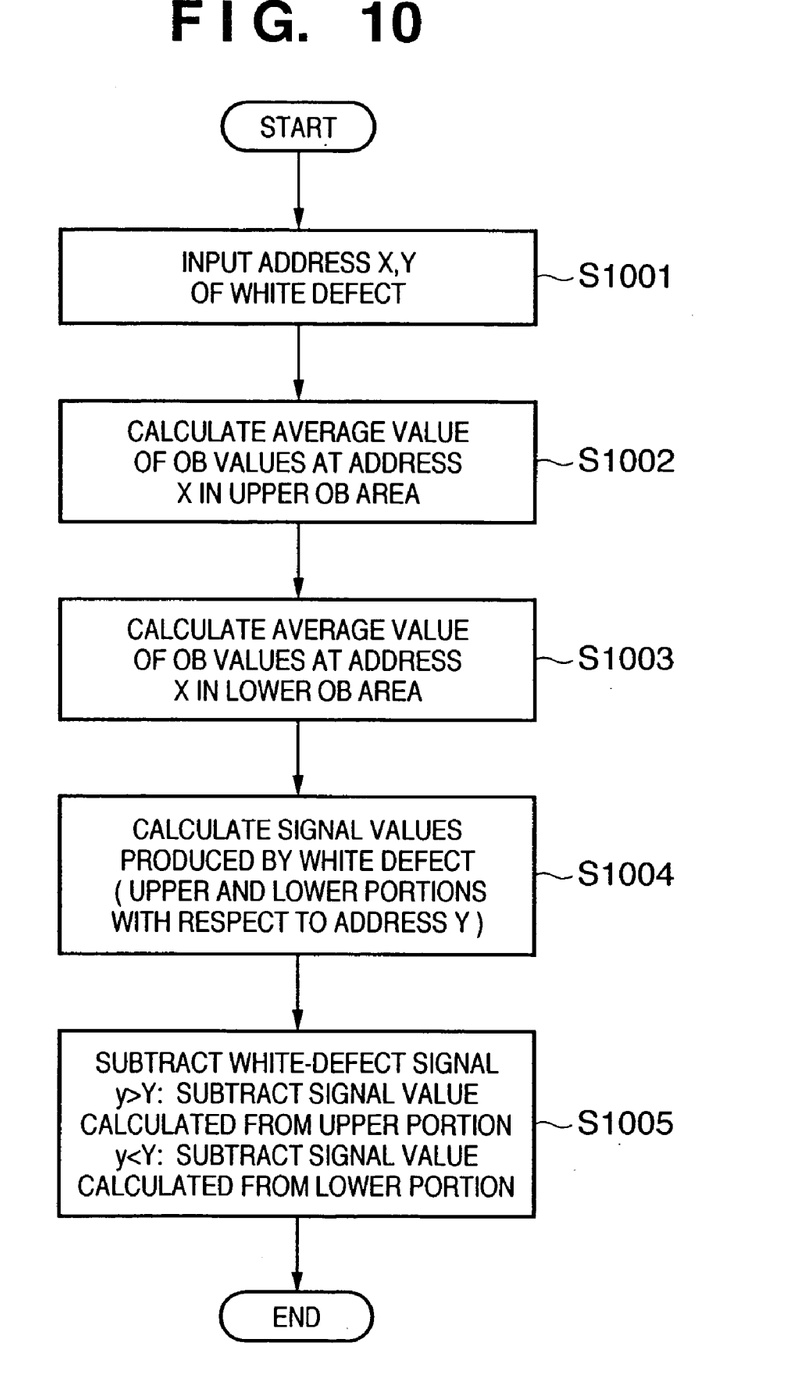
FIG. 10 is a flowchart for describing white-defect correction processing according to a third embodiment of the present invention.

Accordingly, the third embodiment will be described with regard to a correction in a case where a signal value produced due to a white defect is not a uniform value throughout the vertical lines. It will be assumed that the address (X,Y) of a defective pixel is known. As shown in FIG. 10, the address (X,Y) of a white defect is input at step S1001.

Next, at step S1002, the average value of OB values of every vertical line at the horizontal address X in the upper OB area 11 is calculated using the technique described in the first embodiment. Similarly, the average value of OB values of every vertical line at the horizontal address X in the lower OB area 13 is calculated in step S1003.

Signal values produced from white defects in the upper OB area 11 and lower OA area 13 are calculated at step S1004 using the technique described in the first embodiment with reference to FIG. 6. The white-defect signal value calculated from the upper OB area 11 is subtracted from a signal value of each pixel vertically above the vertical address Y of the white defect, and the white-defect signal value calculated from the lower OB area 13 is subtracted from a signal value of each pixel vertically below the vertical address Y.

In this case also it is so arranged that whether the white defect line has saturated is determined, as described in the second embodiment. If the white defect line has not saturated, then processing indicated at S1005 in FIG. 10 may be executed. If the white defect line has saturated, then horizontal interpolation (see FIG. 9) performed at step S802 in FIG. 8 may be executed.

By virtue of the above-described technique, a white-defect correction can be carried out correctly even in a case where a signal value produced due to a white defect is not a uniform value throughout the vertical lines and the white defect starts being produced from the location of a defective pixel in a vertical line.

Thus, in accordance with the first to third embodiments, a signal value ascribable to a white defect is obtained by utilizing a signal from an optical black area. Accordingly, as in an optical black image, exposure is performed for a period of time the same as that of the main image sensing operation, it is no longer necessary to drive the device so as to read out the signal, and a high-quality image can be obtained without a release time lag merely by subtracting the obtained signal value of white defect from the signal of the effective pixel area.

Further, in the case of a long exposure time, the signal of the effective pixel area obtained by the main image sensing operation may be corrected using a black image obtained by exposing the effective pixel area in a state in which light is shielded from the effective area for a period of time the same as that of the main image sensing operation. In the case of a short exposure time, the white-defect correction may be performed by the method of the embodiments. In this manner, when the exposure time is long, an image of excellent image quality is obtained even though the above correction method takes time, and when the exposure time is short, an image of excellent image quality is obtained without a release time lag. Thus, it is possible to apply a correction that is suited to the imaging conditions.

In the first to third embodiments, a vertical line having a white defect is selected and the correction processing is performed on the pixel values of the selected vertical line. However, such a vertical line having a white defect is not necessarily limitative. Any one of a signal from a vertical line having a defect can be selected and corrected. To give an example, it is possible to select and correct a signal from a vertical line having a smear.

Other Embodiment

The invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-372577 filed on Oct. 31, 2003, which is hereby incorporated herein by reference herein.

What is claimed is:

1. An image sensing apparatus comprising:
   an image sensor having an effective pixel area and an optical black area provided at least above or below the effective pixel area;
   a calculation circuit configured to calculate an average value of optical black values, by each vertical line, of the optical black area;
   a white defect determination circuit configured to determine that there is a white defect in a vertical line of the image sensor if the average value of optical black values of the vertical line calculated by said calculation circuit is equal to or greater than a first threshold value;
   a correction value calculation circuit configured to calculate a white defect correction value on the basis of the optical black value of the vertical line determined as having a white defect by said white defect determination circuit and optical black values of vertical lines located on the right and left of the vertical line determined as having a white defect; and
   a white defect correction circuit configured to perform white defect correction by subtracting the white defect correction value from signal values of effective pixels in the vertical line determined as having the white defect in the effective pixel area,
   wherein said first threshold is determined on the basis of a standard deviation of a normal distribution with regard to the average values of optical black values of respective vertical lines calculated by said calculation circuit.

2. The image sensing apparatus according to claim 1, wherein said white defect correction circuit takes as a white defect signal value due to the white defect a difference between the average value of the optical black values of the vertical line determined as having the white defect by said white detect determination circuit and an average value of the optical black values of a vertical line, neighboring the vertical line determined as having the white defect, determined as not having the white defect, and subtract the white defect signal value from a signal value of each pixel of the image sensor included in the vertical line determined as having the white defect.

3. The image sensing apparatus according to claim 2, wherein said calculation circuit calculates the average value of the optical black value by each vertical line in an upper optical black area and in a lower optical black area, and said white defect correction circuit obtains white defect signal values of the vertical line determined as having the white defect independently for the upper optical black area and the lower optical black area, subtracts the white defect signal value of the upper optical black area from a signal value of each pixel, which is on an upper side of the image sensor with respect to a predetermined vertical address, included in the vertical line determined as having the white defect, and subtract the white defect signal value of the lower optical black area from a signal value of each pixel, which is on a lower side of the image sensor with respect to a predetermined vertical address, included in the vertical line determined as having the white defect.

4. The image sensing apparatus according to claim 1 further comprising a white defect saturation determination circuit configured to determine that the white defect is saturated if the average value of the optical black values of the vertical line determined as having the white defect by said white defect determination circuit is equal to or greater than a second threshold value,
   wherein said white defect correction circuit interpolates each pixel of the vertical line determined as having the saturated white defect by said white defect saturation determination circuit using signal values of pixels on both sides of the pixel to be interpolated.

5. A white defect correction method for correcting signals affected by a white defect of an image sensor having an effective pixel area and an optical black area provided at least above or below the effective pixel area in an image sensing apparatus, said method comprising:
   a calculation step of calculating an average value of optical black values, by each vertical line, of the optical black area;
   a white defect determination step of determining that there is a white defect in a vertical line of the image sensor if the average value of optical black values of the vertical line calculated in said calculation step is equal to or greater than a first threshold value;
   a correction value calculation step of calculating a white defect correction value on the basis of the optical black value of the vertical line determined as having a white defect in said white defect determination step and optical black values of vertical lines located on the right and left of the vertical line determined as having a white defect; and
   a white defect correction step of performing white defect correction by subtracting the white defect correction value from signal values of effective pixels in the vertical line determined as having the white defect in the effective pixel area,
   wherein said first threshold is determined on the basis of a standard deviation of a normal distribution with regard to the average values of optical black values of respective vertical lines calculated in said calculation step.

* * * * *